United States Patent
Gao et al.

(10) Patent No.: US 8,741,076 B2
(45) Date of Patent: Jun. 3, 2014

(54) APPARATUS AND METHOD OF CONTROLLING PHASE TRANSFORMATION TEMPERATURE OF A SHAPE MEMORY ALLOY

(75) Inventors: Xiujie Gao, Troy, MI (US); Alan L. Browne, Grosse Pointe, MI (US); Paul W. Alexander, Ypsilanti, MI (US); Nancy L. Johnson, Northville, MI (US); Wayne Brown, Costa Mesa, CA (US)

(73) Assignees: GM Global Technology Operations LLC, Detroit, MI (US); Dynalloy, Inc, Costa Mesa, CA (US)

( * ) Notice: Subject to any disclaimer, the term of this patent is extended or adjusted under 35 U.S.C. 154(b) by 372 days.

(21) Appl. No.: 13/177,599

(22) Filed: Jul. 7, 2011

(65) Prior Publication Data
US 2013/0011806 A1 Jan. 10, 2013

(51) Int. Cl.
F03G 7/06 (2006.01)
(52) U.S. Cl.
CPC .................................. F03G 7/065 (2013.01)
USPC ................................ 148/402; 60/527; 60/529
(58) Field of Classification Search
None
See application file for complete search history.

(56) References Cited

U.S. PATENT DOCUMENTS

| 4,205,293 | A | * | 5/1980 | Melton et al. | 337/140 |
| 4,484,955 | A | | 11/1984 | Hochstein | |
| 5,619,177 | A | * | 4/1997 | Johnson et al. | 337/140 |
| 8,436,571 | B2 | * | 5/2013 | Hao et al. | 318/631 |
| 2005/0253680 | A1 | * | 11/2005 | Mathews et al. | 337/395 |
| 2008/0022674 | A1 | * | 1/2008 | Brown et al. | 60/527 |
| 2010/0140439 | A1 | * | 6/2010 | Schuh et al. | 248/562 |
| 2011/0120119 | A1 | | 5/2011 | Alexander et al. | |

FOREIGN PATENT DOCUMENTS

| CN | 101078451 A | 11/2007 |
| CN | 100504673 C | 6/2009 |
| DE | 10142998 A1 | 3/2003 |
| EP | 0145204 A1 | 6/1985 |

OTHER PUBLICATIONS

Office Action of the State Intellectual Property Office of the People's Republic of China for corresponding Chinese Patent Application No. 201210236546.8 dated Jan. 15, 2014.

* cited by examiner

*Primary Examiner* — George Wyszomierski
(74) *Attorney, Agent, or Firm* — Quinn Law Group, PLLC

(57) ABSTRACT

A device and method for controlling a phase transformation temperature of a shape memory alloy is provided. The device includes a primary wire composed of the shape memory alloy. The primary wire defines first and second ends, the first end being attached to a fixed structure and the second end being able to displace. An activation source is thermally coupled to the wire and is operable to selectively cause the primary wire to reversibly transform from a Martensitic phase to an Austenitic phase during a cycle. A loading element is operatively connected to the primary wire and configured to selectively increase a tensile load on the primary wire when an ambient temperature is at or above a threshold temperature, thereby increasing the phase transformation temperature of the primary wire.

17 Claims, 7 Drawing Sheets

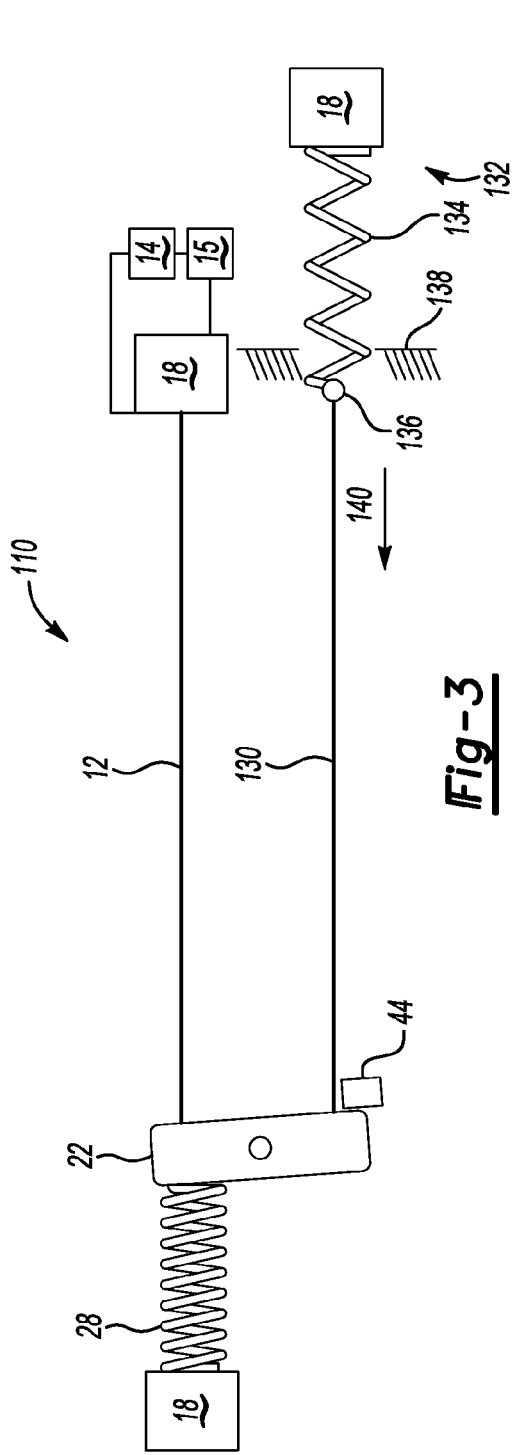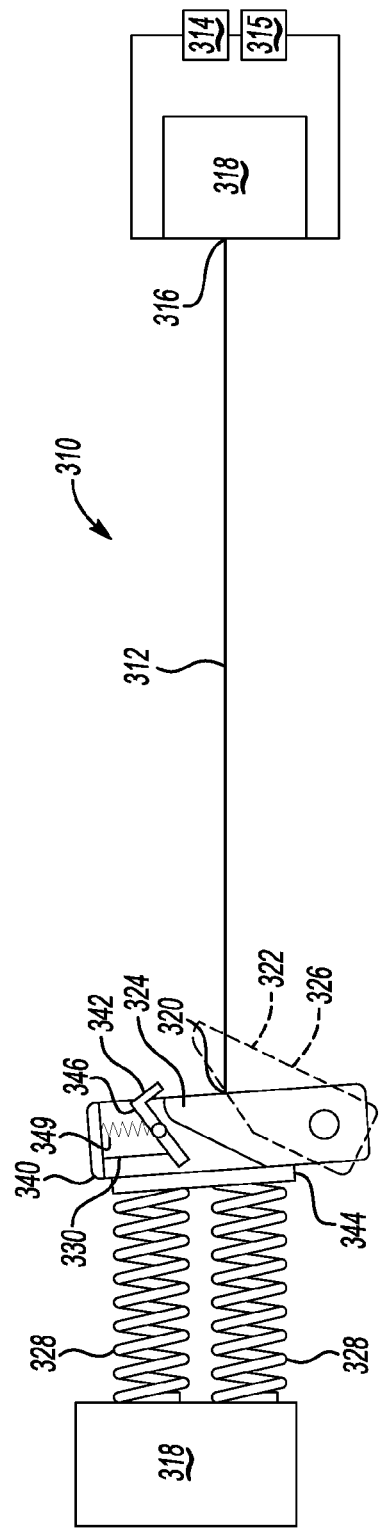

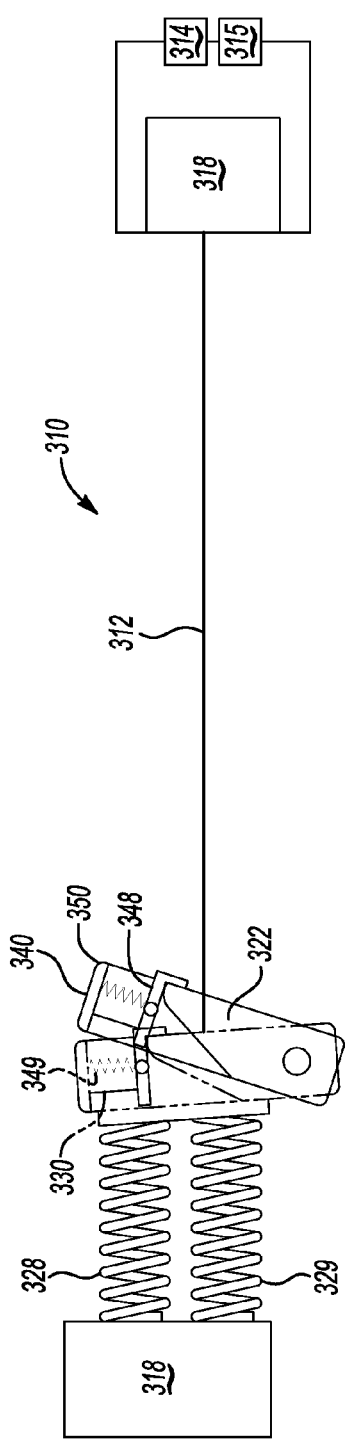
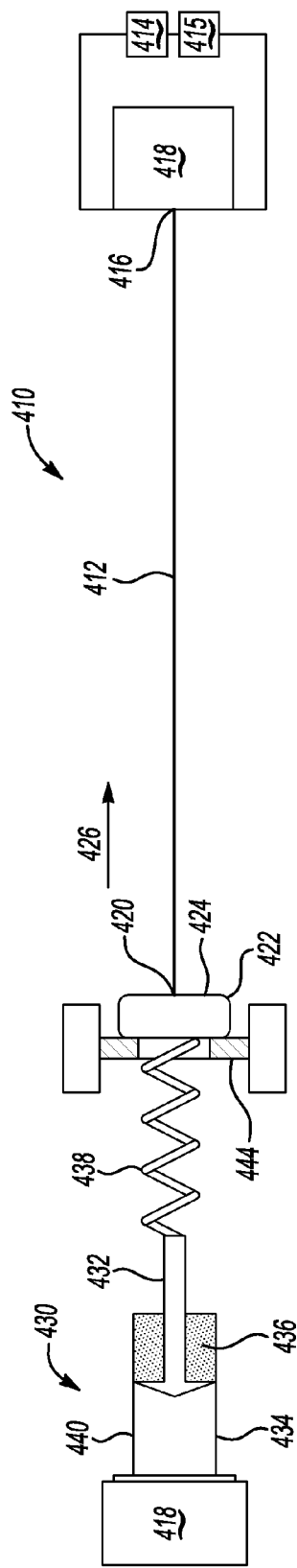

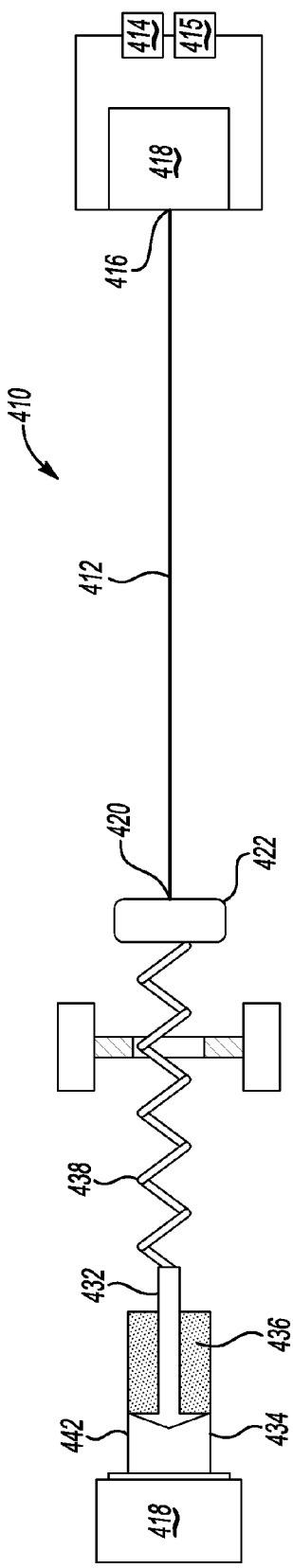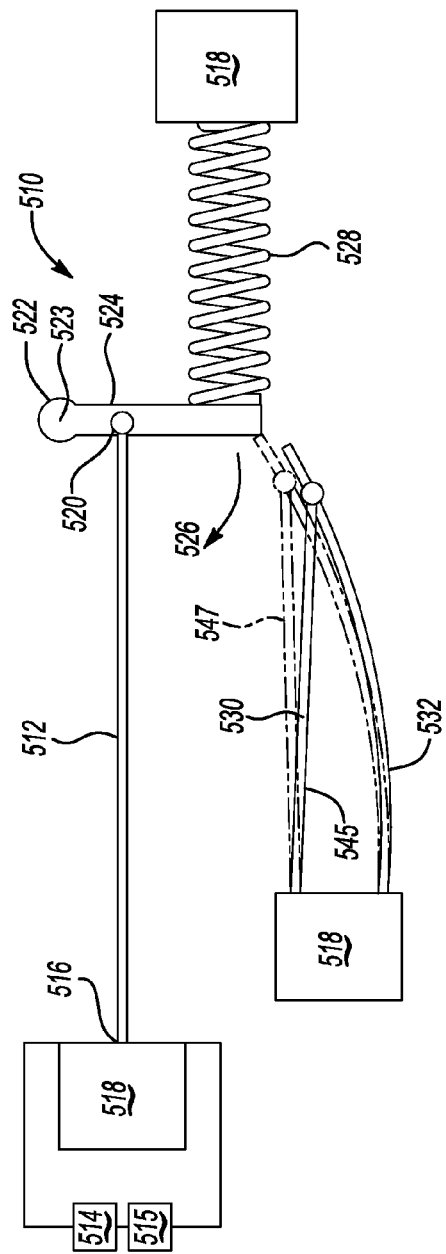

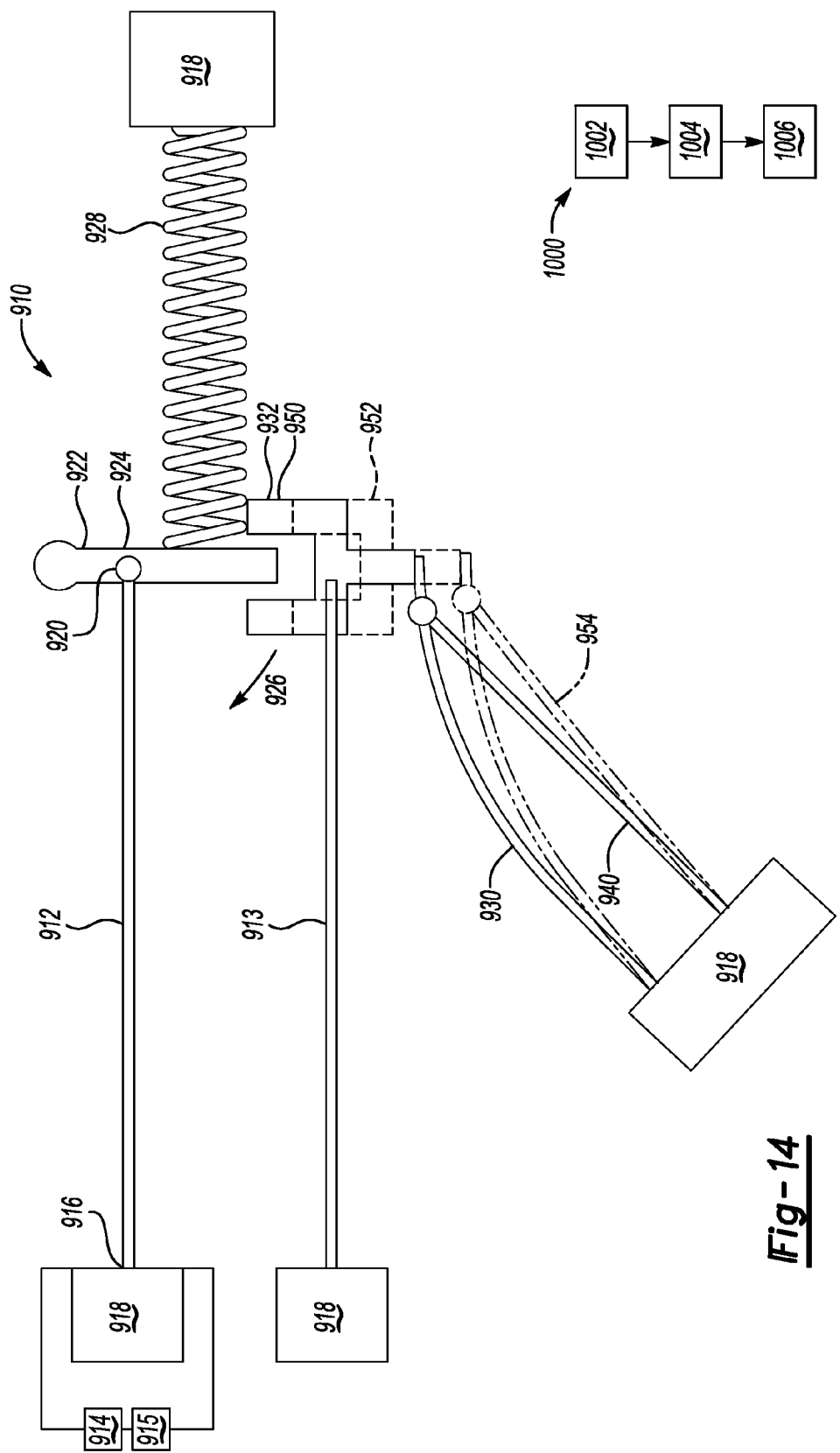

APPARATUS AND METHOD OF CONTROLLING PHASE TRANSFORMATION TEMPERATURE OF A SHAPE MEMORY ALLOY

TECHNICAL FIELD

The invention relates to an apparatus and method of controlling the phase transformation temperature of a shape memory alloy.

BACKGROUND

A shape memory alloy may be used as an actuator, sensor or in another capacity in various devices. Two phases that occur in shape memory alloys are often referred to as Martensite and Austenite phases. The Martensite phase is a relatively soft and easily deformable phase of the shape memory alloys, which generally exists at lower temperatures. The Austenite phase, the stronger phase of shape memory alloys, occurs at higher temperatures. The temperature at which the shape memory alloy remembers its high temperature form, referred to as the phase transformation temperature, can be adjusted by applying stress and other methods. In nickel-titanium shape memory alloys, for example, it can be changed from above about 100° C. to below about −100° C. In applications with higher actuation temperature requirements, the stress applied to a shape memory alloy element may be increased to increase its phase transformation temperature. However, this increase of stress reduces the fatigue life of the shape memory alloy. In other words, continuously operating the shape memory alloy at a higher actuation temperature results in a much shorter life cycle.

SUMMARY

A device adapted for controlling a phase transformation temperature of a shape memory alloy is provided. The device includes a primary wire composed of the shape memory alloy. The primary wire defines first and second ends, the first end being attached to a fixed structure and the second end being able to displace, for example translate or rotate. An activation source is thermally coupled to the wire and is operable to selectively cause the wire to reversibly transform from a Martensitic phase to an Austenitic phase during a cycle. A loading element is operatively connected to the wire and configured to selectively increase a tensile load on the primary wire when an ambient temperature is at or above a threshold temperature, thereby increasing the phase transformation temperature of the primary wire. In other words, the stress on the primary wire is increased only when the ambient temperature is at or above a threshold temperature. The primary wire operates under low stress when the ambient temperature is below a threshold temperature such that a longer life cycle can be achieved. This enables the use of relatively low cost shape memory alloy wires in certain applications which would otherwise require high cost ultra-high transition temperature shape memory alloy wires.

A method of controlling a phase transformation temperature of a primary wire, composed of a first shape memory alloy and defining two ends, is provided. One end of the primary wire is secured in a fixed position such that the other end of the primary wire is able to displace. The primary wire is thermally coupled to an activation source for selectively causing the primary wire to reversibly transform from a Martensitic phase to an Austenitic phase during a cycle. A tensile load on the primary wire is selectively increased when an ambient temperature is at or above a threshold temperature, thereby increasing the phase transformation temperature of the primary wire.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic illustration of a second embodiment for a device in accordance with the present disclosure;

FIG. 5 a schematic illustration of a fourth embodiment for a device in accordance with the present disclosure;

FIG. 6 is a schematic illustration of the device of FIG. 5 when the ambient temperature is above a threshold temperature;

FIG. 7 is a schematic illustration of a fifth embodiment for a device in accordance with the present disclosure, when a primary wire is in a cold state;

FIG. 8 is a schematic illustration of the device of FIG. 7 when the ambient temperature is above a threshold temperature and the primary wire is in a hot state;

FIG. 10 is a schematic illustration of a sixth embodiment for a device in accordance with the present disclosure;

FIG. 14 is a schematic illustration of a tenth embodiment for a device in accordance with the present disclosure;

FIG. 15 is a flow diagram of a method of controlling a transformation temperature of a shape memory alloy, in accordance with the present disclosure.

DETAILED DESCRIPTION

Figure 1:
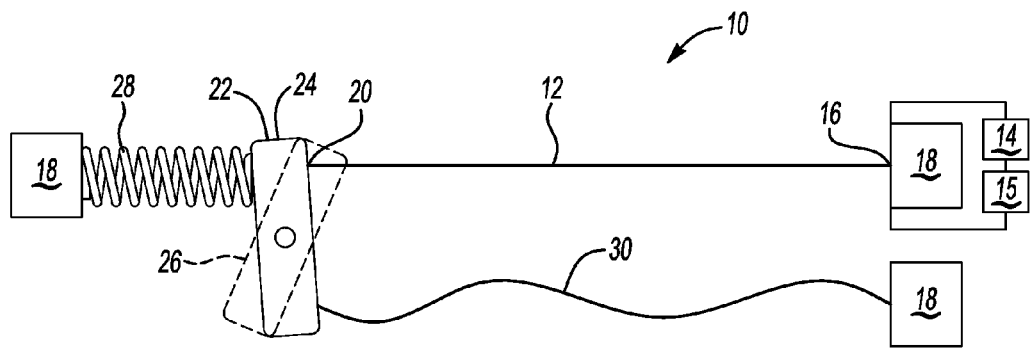
FIG. 1 is a schematic illustration of a device for controlling a phase transformation temperature of a shape memory alloy, in accordance with the present disclosure.
Figure 2:
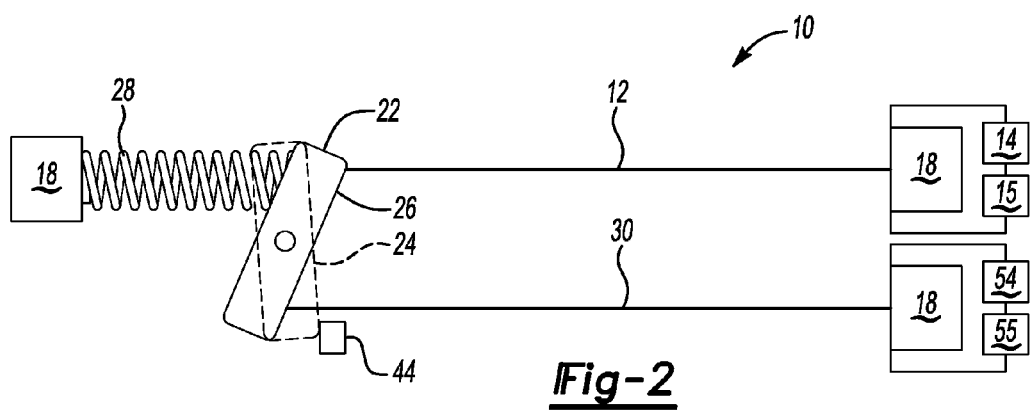
FIG. 2 is a schematic illustration of the device of FIG. 1 when the ambient temperature is above a threshold temperature.

Referring to the Figures, wherein like reference numbers refer to the same or similar components throughout the several views, FIGS. 1-2 show a portion of a device 10 having a primary wire 12 that is composed of a first shape memory alloy (SMA). As used herein the term "wire" is non-limiting and shall include other similar geometric configurations presenting tensile load strength/strain capabilities, such as cables, bundles, braids, ropes, strips, chains, ribbons, springs and other elements.

Suitable shape memory alloys can exhibit a one-way shape memory effect, an intrinsic two-way effect, or an extrinsic two-way shape memory effect depending on the alloy composition and processing history. As previously noted, two phases that occur in shape memory alloys are often referred to as Martensite and Austenite phases. The Martensite phase is a relatively soft and easily deformable phase of the shape memory alloys, which generally exists at lower temperatures.

The Austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic two-way shape memory effect are fabricated from a shape memory alloy composition that will automatically reform themselves upon removal of the cause for deviation.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

A shape memory alloy is characterized by a cold state, i.e., when the temperature of the alloy is below its Martensite finish temperature $M_f$. A shape memory alloy is also characterized by a hot or superelastic state, i.e., when the temperature of the alloy is above its Austenite finish temperature $A_f$. An object formed of the alloy may be characterized by a threshold shape. When the object is pseudo-plastically deformed from its threshold shape in the cold state, the strain may be reversed by heating the object above its austenite finish temperature $A_f$, i.e., applying a thermal activation signal sufficient to heat the object above its $A_f$ will cause the object to return to its threshold shape. An SMA's modulus of elasticity and yield strength are also significantly lower in the cold state than in the hot state. As understood by those skilled in the art, pseudo-plastic strain is similar to plastic strain in that the strain persists when the SMA is in the cold state.

Referring to FIGS. 1-2, an activation source 14 is thermally coupled to the primary wire 12 and is operable to selectively cause the primary wire 12 to reversibly transform from a Martensitic phase to an Austenitic phase during a cycle. The activation signal from the activation source 14 may include, but is not limited to, a heat signal or an electrical signal, with the particular activation signal dependent on the materials and/or configuration of the shape memory alloy and/or the device. A controller 15 is operatively coupled to and configured to control the activation source 14. For example, the controller 15 may direct an electrical current through the primary wire 12 to heat the primary wire 12. A first end 16 of the primary wire 12 is operatively connected to a fixed structure 18. A second end 20 of the primary wire 12 is operatively connected to a rotatable lever 22 such that second end 20 is able to displace, for example translate or rotate. The lever 22 assumes a first lever position 24 when the primary wire 12 is in its cold state, and a second lever position 26 (shown in phantom) when the primary wire 12 is in its hot state. A first spring 28 is operatively connected to the lever 22 at one end and configured to bias the lever 22 towards the first lever position 24.

Referring to FIGS. 1-2, a secondary wire 30 is operatively connected to the lever 22. The secondary wire 30 is composed of a second shape memory alloy having a lower phase transformation temperature than the primary wire, i.e., the secondary wire 30 has a lower Austenite finish temperature than the Austenite start temperature of the primary wire 12. The secondary wire 30 is configured as a loading element to selectively increase a tensile load on the primary wire 12 when the ambient temperature is at or above a threshold temperature, thereby increasing the transformation temperature of the primary wire 12. In the embodiment of FIGS. 1-2, the threshold temperature is at least the Austenite start temperature of the secondary wire 30. The primary wire 12 and secondary wire 30 are characterized by respective predetermined lengths to which they revert in their hot state after being pseudo-plastically deformed. As shown in FIGS. 1-2, the primary wire 12, secondary wire 30 and first spring 28 are each fixed at one end to the fixed structure 18, such as a common housing. Alternatively, each of the primary wire 12, secondary wire 30 and first spring 28 may be fixed to separate fixed structures.

Referring to FIG. 1, during normal operation when the ambient temperature is below the Austenite start temperature of the secondary wire 30 and the primary wire 12 is in its cold state, its elastic modulus and yield strength are sufficiently low such that the lever 22 is in the first lever position 24, thereby elongating the primary wire 12 from its predetermined length. The secondary wire 30 may be slack as shown in FIG. 1 or straight (not shown). Since the secondary wire 30 is in its cold state, its elastic modulus and yield strength are sufficiently low such that the secondary wire 30 is elongated from its predetermined length. When the primary wire 12 is activated to its hot state by the activation source 14, the primary wire 12 reverts to its predetermined length and increases in modulus, thereby drawing the lever 22 towards the second lever position 26 (shown in phantom in FIG. 1) and extending the secondary wire 30. The secondary wire 30 does not apply any stress on the primary wire 12 in either of these situations. Thus, during normal operation when the ambient temperature is below the Austenite start temperature of the secondary wire 30, the secondary wire 30 remains dormant and allows the primary wire 12 to operate at lower stress conditions.

Referring to FIG. 2, when the ambient temperature reaches the Austenite start temperature of the secondary wire 30, the secondary wire 30 begins a crystallographic phase transformation between Austenite and Martensite. As the ambient temperature increases to above the Austenite finish temperature of the secondary wire 30, the secondary wire 30 enters its hot or superelastic state, causing the secondary wire 30 to revert to its predetermined length and increase in modulus. Next, when the primary wire 12 is activated to its hot state by the activation source 14, the primary wire 12 reverts to its predetermined length and increases in modulus, drawing the lever 22 towards the second lever position 26 and thereby stretching the secondary wire 30. The secondary wire 30 exerts a force when it is stretched, increasing the tensile load or stress on the primary wire 12. The amount of force exerted by the secondary wire 12 can be tuned by its composition, transformation temperatures as well as its total cross-sectional area.

Referring to FIG. 2, optionally, a fixed stop member 44 may be positioned adjacent to the lever 22 to block the lever 22 from moving beyond the first lever position 24, in order to prevent the primary wire 12 from being stretched further when it is in its cold state. In other words, the primary wire 12 can "rest" without any applied stress. Without a stop member 44, when the primary wire 12 is in its cold state a tensile stress may be applied on the primary wire 12 by the bias spring 28 and the secondary wire 30 if the ambient temperature is above the Austenite start temperature of the secondary wire 30.

In one example, the threshold temperature is 5% to 90% lower than the initial transformation temperature of the primary wire 12. In one example, the additional tensile load applied by the secondary wire 30 is approximately 5% to 90% of the nominal load (tensile) experienced by the primary wire 12. The nominal load is the load experienced by the primary wire 12 in the absence of the secondary wire 30. By way of example only, the primary wire 12 may be composed of a first nickel-titanium based alloy having an Austenite finish temperature, without stress, of about 65 Celsius. In one example, the secondary wire 30 may be composed of a second nickel-titanium based alloy having an Austenite finish temperature, without stress, of about 70 Celsius. Here, when the ambient temperature exceeds 70 Celsius, the secondary wire 30 in the device 10 may apply a tensile load on the primary wire 12 of approximately 175 MP, thereby increasing the Austenite finish temperature of the primary wire 12 to approximately 90 Celsius.

Optionally, the secondary wire 30 may be connected to a second activation source 54, coupled to a controller 55, as shown in FIG. 2. The second activation source 54 may be configured to pass a heating current to the secondary wire 30, heating the secondary wire 30 to its hot state and selectively increasing the amount of stress applied to the primary wire 12. By passing a larger magnitude of current through the secondary wire 30 when the primary wire 12 is resetting or moving from its hot to its cold state, stress hysteresis by the secondary wire 30 may be eliminated. That is, at a fixed temperature, the stress required to stretch the secondary wire 30 is typically higher than the stress applied by the secondary wire 30 in contracting.

Referring to FIG. 3, wherein like reference numbers refer to like components from FIGS. 1-2, a device 110 illustrating a second embodiment is shown. FIG. 3 schematically depict a secondary wire 130 composed of a second shape memory alloy having a lower phase transformation temperature than the primary wire 12, is operatively connected to the lever 22. The secondary wire 130 is configured as a loading element to selectively increase a tensile load on the primary wire 12 when the ambient temperature increases above a threshold value. The embodiment in FIG. 3 further includes a strain-limiting mechanism 132 that may be attached between the secondary wire 130 and the fixed structure 18. The strain-limiting mechanism 132 includes a second spring 134, connector 136 and limiting member 138. The second spring 134 is pre-tensioned and exerts a nearly constant force on the secondary wire 130. The limiting member 138 at least partially surrounds the connector 136 and is configured to limit the amount that the second spring 134 stretches the secondary wire 130. In other words, the limiting member 138 is configured to prevent the secondary wire 130 from being strained beyond a set point.

During normal operation, when the ambient temperature is below the Austenite start temperature of the secondary wire 130, the operation of the device 110 is the same as the device 10 shown in FIGS. 1-2. Referring to FIG. 3, when the ambient temperature is at or above the Austenite start temperature of the secondary wire 130, the secondary wire 130 begins changing crystallographic phase from Marteniste to Austenite, thereby exerting a force on the lever 22. However, the second spring 134 is selected such that the force exerted by the secondary wire 130 at this stage is insufficient to overcome the biasing force in the second spring 134, such that the second spring 134 remains in position. When the ambient temperature is at or above the Austenite finish temperature of the secondary wire 130, the secondary wire 130 enters its hot state, causing the secondary wire 130 to revert to its predetermined length and increase in modulus, and exerting force that is sufficient to exceed the biasing force in the second spring 134, thereby stretching the second spring 134 in the direction 140. Thus the threshold temperature for the embodiment in FIG. 3 is the Austenite finish temperature of the secondary wire 130. The force and displacement profile in the second spring 134 allows the secondary wire 130 to overcome stress hysteresis as previously mentioned. For example, if the second spring 134 is long, then the force it applies is nearly constant within the moving range of the secondary wire 130. This minimizes the stress hysteresis of the secondary wire; as is known, at a fixed temperature, the stress required to stretch the secondary wire 30 is typically higher than the stress applied by the secondary wire 30 when it contracts. In addition, this minimizes the temperature dependence of the stress applied by the secondary wire 130.

Figure 4:
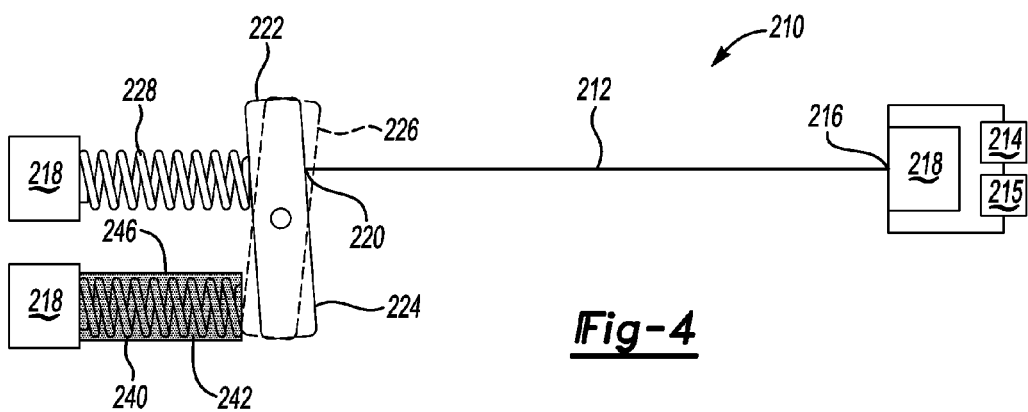
FIG. 4 is schematic illustration of a third embodiment for a device in accordance with the present disclosure.

Referring to FIG. 4, a device 210 illustrating a third embodiment is shown. The device 210 includes a primary wire 212 that is composed of a first shape memory alloy (SMA). An activation source 214 is thermally coupled to the primary wire 212 and is operable to selectively cause the primary wire 212 to reversibly transform from a Martensitic phase to an Austenitic phase during a cycle. A controller 215 is operatively coupled to and configured to control the activation source 214. A first end 216 of the primary wire 212 is attached to a fixed structure 218. A second end 220 is operatively connected to a rotatable lever 222 such that second end 220 is able to displace, for example, translate or rotate. The lever 222 assumes a first lever position 224 when the primary wire 212 is in its cold state, and a second lever position 226 (shown in phantom) when the primary wire 212 is in its hot state. A first spring 228 is operatively connected to the lever 222 and configured to bias the lever 222 towards the first lever position 224. The device 210 includes a compression spring 240 that is fixed at one end, for example, by attachment to a fixed structure 218. The compression spring 240 is at least partially surrounded by a reversible phase-change material 242, both of which may be positioned in a housing 246. The phase-change material 242 is selected to have a solid-to-liquid phase transformation temperature at the threshold temperature.

Referring to FIG. 4, during normal operation when the ambient temperature is below a threshold temperature, the phase-change material 242 is substantially solid and configured to lock or compress the compression spring 240. When the ambient temperature reaches a threshold temperature, the phase-change material 242 undergoes a solid-to-liquid phase transformation and is configured to release the compression spring 240 such that the compression spring 240 exerts a tensile load on the primary wire 212 when the primary wire 212 is actuated. Thus, the compression spring 240 functions as a loading element that is configured to selectively increase a tensile load on the primary wire 212 when an ambient temperature is at or above a threshold temperature, thereby increasing the phase transformation temperature of the primary wire 212. In one example, the phase-change material 242 is paraffin wax. Any suitable material having a solid-to-liquid phase transformation temperature at the threshold temperature may be used.

Referring to FIGS. 5-6, a device 310 illustrating a fourth embodiment is shown. The device 310 includes a primary wire 312 that is composed of a first shape memory alloy (SMA). An activation source 314 is thermally coupled to the primary wire 312 and is operable to selectively cause the primary wire 312 to reversibly transform from a Martensitic phase to an Austenitic phase during a cycle. A controller 315 is operatively coupled to and configured to control the activation source 314. A first end 316 of the primary wire 312 is attached to a fixed structure 318. A second end 320 of the primary wire 312 is operatively connected to a rotatable lever 322 such that second end 320 is able to displace, for example, translate or rotate. The lever 322 assumes a first lever position 324 when the primary wire 312 is in its cold state, and a second lever position 326 (shown in phantom) when the primary wire 312 is in its hot state. A first spring 328 is operatively connected to the lever 322 and configured to bias the lever 322 towards the first lever position 324.

Referring to FIG. 6, the device 310 includes a secondary wire 330 to couple and uncouple an auxiliary lever 340 such that the stress in the primary wire 312 can be increased when the ambient temperature is at or above the threshold temperature. The secondary wire 330 is composed of a second shape memory alloy having a lower transformation temperature than the first shape memory alloy. The auxiliary lever 340 that may be selectively coupled to the lever 322 through a pivoted hook 342. The hook 342 is rotatable relative to the auxiliary lever 340, between a first hook position 346 and a second hook position 348. A second spring 329 is operatively connected to and configured to bias the auxiliary lever 340 toward its first position 350. A third spring 349 is operatively connected to and configured to bias the hook 342 towards the first hook position 346. A stop member 344 may be employed to prevent the lever 322 and auxiliary lever 340 from moving beyond a set point. The primary wire 312 and secondary wire 330 are characterized by respective predetermined lengths to which they revert in their hot state after being pseudo-plastically deformed.

Referring to FIG. 5, during normal operation when the ambient temperature is below the Austenite start temperature of the secondary wire 330, the hook 342 is in the first hook position 346. As the primary wire 312 transforms between its cold and hot states, the auxiliary lever 340 remains dormant. Referring to FIG. 6, when the ambient temperature is at or above the Austenite start temperature of the secondary wire 330, the secondary wire 330 reverts to its predetermined length and increases in modulus, urging the hook 342 towards the second hook position 348, thereby coupling the auxiliary lever 340 to the lever 322. Next, when the primary wire 312 is activated to its hot state, the primary wire 312 reverts to its predetermined length and increases in modulus, thereby exerting a force on the lever 322, which is now coupled to the auxiliary lever 340 (see position 350 in FIG. 6). The coupling of the auxiliary lever 340 to the lever 322 selectively increases the tensile load on the primary wire 312.

Referring to FIGS. 7-8, a device 410 illustrating a fifth embodiment is shown. The device 410 includes a primary wire 412 that is composed of a first shape memory alloy (SMA). An activation source 414 is thermally coupled to the primary wire 412 and is operable to selectively cause the primary wire 412 to reversibly transform from a Martensitic phase to an Austenitic phase during a cycle. A controller 415 is operatively coupled to and configured to control the activation source 414. A first end 416 of the primary wire 412 is operatively connected to a fixed structure 418 while a second end 420 is operatively connected to a translatable slider 422 such that the second end 420 is able to displace, for example, translate or rotate. A heat-expandable element 430 is operatively connected to the slider 422. The heat-expandable element 430 includes an attachment member 432 at least partially located within a housing 434 and at least partially surrounded by a phase-change material 436. The housing 434 may be attached to a fixed structure 418. An extension spring 438 is operatively connected to the slider 422 at one end and the attachment member 432 at the other end. The primary wire 412 is characterized by a predetermined length to which the primary wire 412 reverts in its hot state after being pseudo-plastically deformed.

FIG. 7 illustrates the device 410 when the ambient temperature is below a threshold temperature and the primary wire 412 is in its cold state. Referring to FIG. 7, during normal operation when the ambient temperature is below a threshold temperature and the primary wire 412 is in its cold state, the elastic modulus and yield strength of the primary wire 412 are sufficiently low such that the slider 422 is in a first slider position 424, thereby elongating the primary wire 412 from its predetermined length. When the primary wire 412 is heated to its hot state, the primary wire 412 reverts to its predetermined length and increases in modulus, thereby drawing the slider 422 in the direction 426 and stretching the extension spring 438. The heat-expandable element 430 remains dormant in a rest configuration 440 (shown in FIG. 7) and does not apply any stress on the primary wire 412 in either of these situations.

Referring to FIG. 8, when the ambient temperature exceeds the threshold temperature, the heat-expandable element 430 moves to an extended configuration 442. In the extended configuration 442, the phase-change material 436 expands to a larger volume, pulling the attachment member 432 and therefore the slider 422 and extension spring 438. FIG. 8 illustrates the device 410 when the ambient temperature is at or above the threshold temperature and the primary wire 412 is in its hot state. Referring to FIG. 8, when the primary wire 412 is heated to its hot state, the primary wire 412 reverts to its predetermined length and increases in modulus, thereby drawing the slider 422 in the direction 426 and exerting a force on the extension spring 438. The opposing force applied by the heat-expandable element 430 in the extended configuration selectively increases the tensile load on the primary wire 412. Optionally, a fixed stop member 444 may be used to prevent the slider 422 from translating towards the heat-expandable element 430 beyond a set point, thereby preventing the primary wire 412 from being stretched when the primary wire 412 is in its cold state. In other words, the stop member 444 prevents the force exerted by the bias spring 438 and the heat-expandable element 430 in the extended configuration from being transmitted to the primary wire 412 until the primary wire 412 is heated to its hot state.

The heat-expandable element 430 may be formed with any suitable materials that have a large coefficient of thermal expansion. In one example, the phase-change material 436 is paraffin wax. The threshold temperature in this case is the temperature at which the heat-expandable element 430 sufficiently expands to overcome the biasing force and stretches the extension spring 438.

Figure 9:
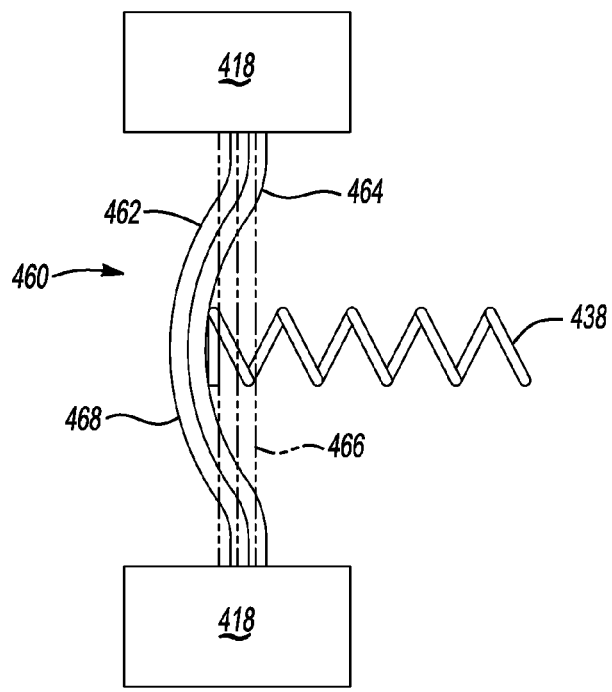
FIG. 9 is a schematic illustration of an alternative heat-expandable element for the device of FIGS. 7-8.

Referring to FIG. 9, in an alternative embodiment, the heat-expandable element 430 in FIGS. 7-8 may be a bimetallic element 460 having first and second metallic layers 462, 464, each with a different coefficient of thermal expansion. In one example, the first metallic layer 462 is copper and the second metallic layer 464 is steel. The first and second metallic layers 462, 464 may be rigidly joined together throughout their length by welding or other suitable methods. When the ambient temperature is below a threshold temperature, the bimetallic element 460 assumes a rest configuration 466, shown in phantom in FIG. 9. When the ambient temperature is at or above the threshold temperature, the first and second metallic layers 462, 464 expand at different rates, causing the bimetallic element 460 to bend or deform into the extended configuration 468 and thereby stretching the extension spring 438. In another embodiment, the heat-expandable element may be a Nylon rod having a coefficient of thermal expansion of approximately 0.0001 per Kelvin.

Referring to FIG. 10, a device 510 illustrating a sixth embodiment is shown. The device 510 includes a primary wire 512 that is composed of a first shape memory alloy (SMA). An activation source 514 is thermally coupled to the primary wire 512 and is operable to selectively cause the primary wire 512 to reversibly transform from a Martensitic phase to an Austenitic phase during a cycle. A controller 515 is operatively coupled to and configured to control the activation source 514. A first end 516 of the primary wire 512 is attached to a fixed structure 518. A second end 520 is operatively connected to a rotatable lever 522 such that second end 520 is able to displace, for example, translate or rotate. The lever 522 assumes a first lever position 524 when the primary wire 512 is in its cold state, and rotates in the direction 526 when the primary wire 512 is in its hot state. The rotatable lever 522 has a pivot point 523, shown in FIG. 10. A first spring 528 is operatively connected to the lever 522 at one end and configured to bias the lever 522 towards the first lever position 524.

Referring to FIG. 10, the device 510 includes a secondary wire 530 composed of a second shape memory alloy having a lower transformation temperature than the primary wire 512. The secondary wire 530 is operatively connected to a leaf spring 532 at one end and a fixed structure 518 at another end. The primary wire 512 and secondary wire 530 are characterized by respective predetermined lengths to which they revert in their hot state after being pseudo-plastically deformed.

Referring to FIG. 10, during normal operation when the ambient temperature is below the Austenite start temperature of the secondary wire 530, the secondary wire 530 assumes a first position 545. When the ambient temperature is at or above the Austenite start temperature of the secondary wire 530, the secondary wire 530 begins changing crystallographic phase from Martenise to Austenite, thereby exerting a force on the leaf spring 532. However the force exerted by the secondary wire 530 is insufficient to overcome the biasing force of the leaf spring 532. Referring to FIG. 10, when the ambient temperature is above the Austenite finish temperature of the secondary wire 530, the secondary wire 530 enters its hot state, causing the secondary wire 530 to revert to its predetermined length and increase in modulus, and exerting a force sufficient to overcome the biasing force of the leaf spring 532. This draws or pulls the leaf spring 532 into the path of the lever 522, as shown in phantom at position 547 in FIG. 10. In this case, when the primary wire 512 is activated to its hot state, it encounters resistance to the rotation of the lever 522 (opposing force) as it rotates in the direction 526. Thus, the secondary wire 530 is configured as a loading element to selectively increase the stress in the primary wire 512 when the ambient temperature is at or above a threshold temperature. The threshold temperature in this case is at least the Austenite start temperature of the secondary wire 530.

Figure 11:
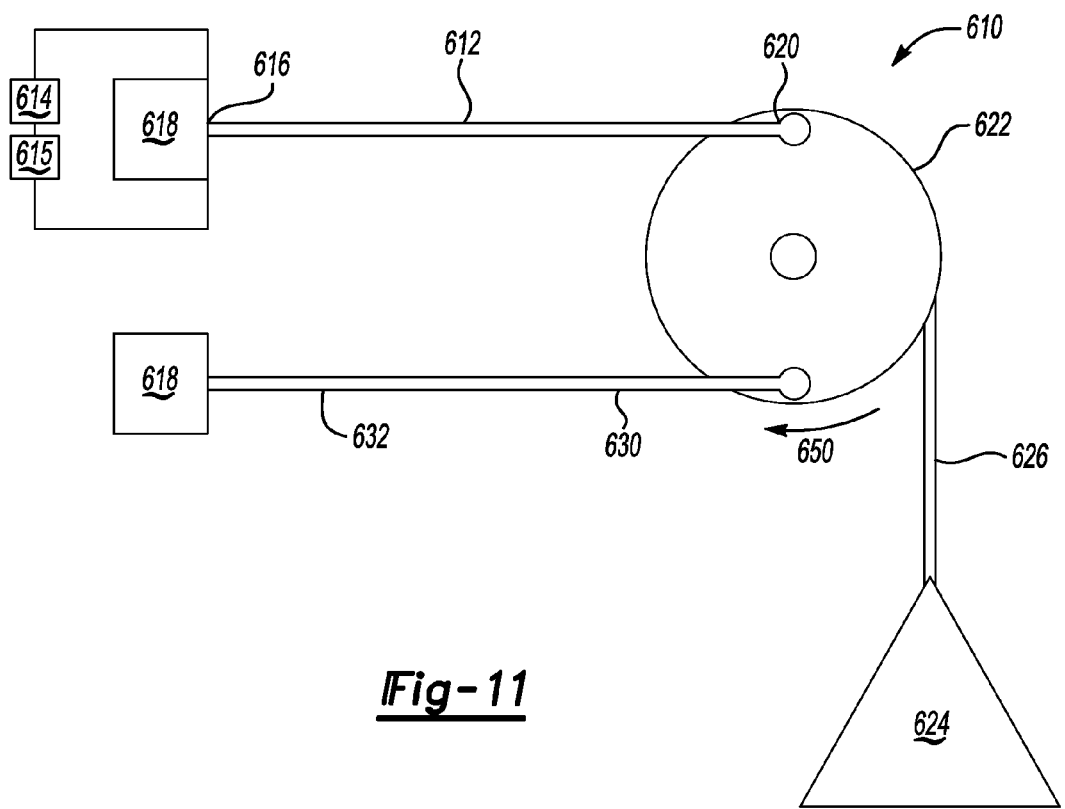
FIG. 11 is a schematic illustration of a seventh embodiment for a device in accordance with the present disclosure.

Referring to FIG. 11, a device 610 illustrating a seventh embodiment is shown. The device 610 includes a primary wire 612 that is composed of a first shape memory alloy (SMA). An activation source 614 is thermally coupled to the primary wire 612 and is operable to selectively cause the primary wire 612 to reversibly transform from a Martensitic phase to an Austenitic phase during a cycle. A controller 615 is operatively coupled to and configured to control the activation source 614. A first end 616 of the primary wire 612 is attached to a fixed structure 618. A second end 620 is operatively connected to a pulley 622 such that second end 620 is able to displace, for example translate or rotate. A force element 624 is operatively connected to the primary wire 612, for example through a low-friction string 626. The force element 624 may be a weight, spring or any other mechanism configured to exert a force. A secondary wire 630 is operatively connected to the pulley 622 at one end and to a fixed structure 618 at another end. The secondary wire 630 is configured to create an opposing force on the primary wire 612 when the ambient temperature exceeds a threshold temperature. The primary wire 612 and secondary wire 630 are characterized by respective predetermined lengths to which they revert in their hot state after being pseudo-plastically deformed.

During normal operation when the ambient temperature is below the Austenite start temperature of the secondary wire 630 and the primary wire 612 is in its cold state, the elastic modulus and yield strength of the primary wire 612 are sufficiently low such that the primary wire 612 is elongated from its predetermined length. When the primary wire 612 is activated to its hot state, the primary wire 612 reverts to its predetermined length and increases in modulus, such that the primary wire 612 lifts or extends the force element 624. While the ambient temperature remains below the Austenite start temperature of the secondary wire 630, the secondary wire 630 remains dormant in position 632 and allows the primary wire 612 to operate at lower stress conditions.

Referring to FIG. 11, when the ambient temperature reaches the Austenite start temperature of the secondary wire 630, the secondary wire 630 begins a crystallographic phase transformation between Austenite and Martensite. As the ambient temperature increases to above the Austenite finish temperature of the secondary wire 630, the secondary wire 630 enters its hot state, causing the secondary wire 630 to increase in modulus and in turn urges the pulley 622 in the direction 650, shown in FIG. 11. This increases the tensile load or stress on the primary wire 612.

Figure 12:
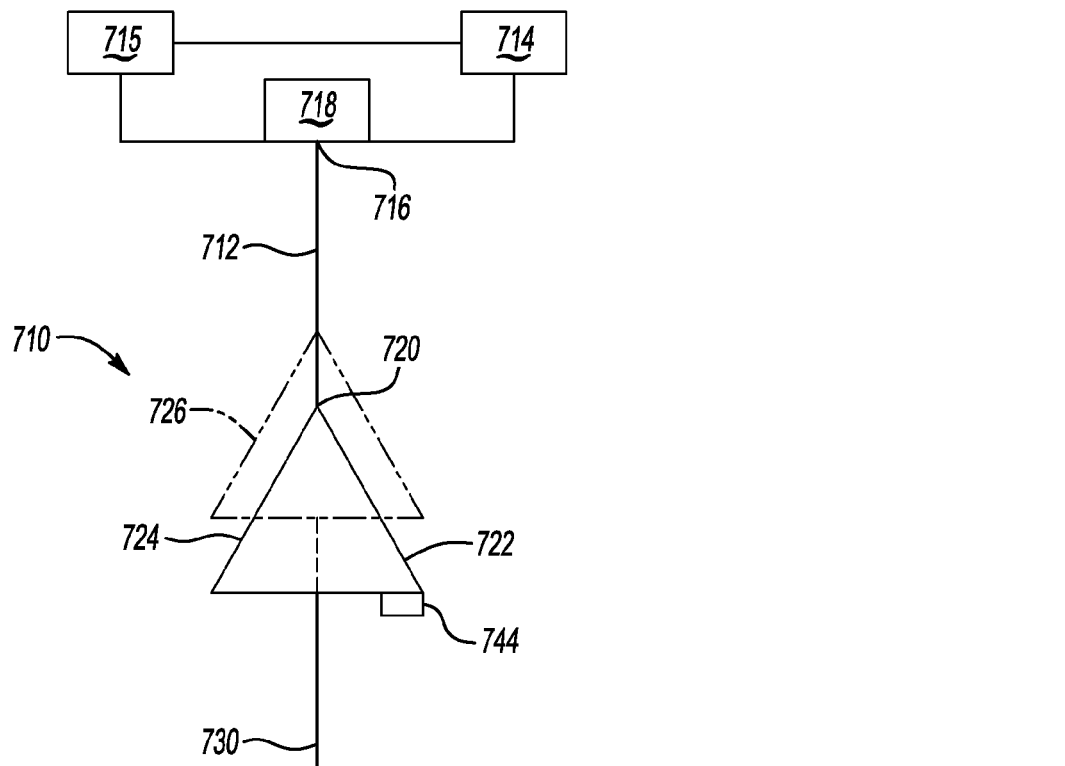
FIG. 12 is a schematic illustration of an eighth embodiment for a device in accordance with the present disclosure.

Referring to FIG. 12, a device 710 illustrating an eighth embodiment is shown. The device 710 includes a primary wire 712 that is composed of a first shape memory alloy (SMA). An activation source 714 is thermally coupled to the primary wire 712 and is operable to selectively cause the primary wire 712 to reversibly transform from a Martensitic phase to an Austenitic phase during a cycle. A controller 715 is operatively coupled to and configured to control the activation source 714. A first end 716 of the primary wire 712 is attached to a fixed structure 718. A second end 720 is operatively connected to a force element 722, for example through a low-friction string, such that second end 720 is able to displace, for example, translate or rotate. The force element 722 may be a weight, spring or any other mechanism configured to exert a force. A secondary wire 730 is operatively connected to the force element 722 at one end and to a fixed structure 718 at another end. The secondary wire 730 is configured to create an opposing force on the primary wire 712 when the ambient temperature exceeds a threshold. The primary wire 712 and secondary wire 730 are characterized by respective predetermined lengths to which they revert in their hot state after being pseudo-plastically deformed.

Referring to FIG. 12, during normal operation when the ambient temperature is below the Austenite start temperature of the secondary wire 730 and the primary wire 712 is in its cold state, its elastic modulus and yield strength are sufficiently low such that the force element 722 is in the first element position 724, thereby elongating the primary wire 712 from its predetermined length. The secondary wire 730 may be straight or slack. When the primary wire 712 is heated to its hot state, the primary wire 712 reverts to its predetermined length and increases in modulus, thereby lifting (or extending) the force element 722 towards the second element position 726 (shown in phantom in FIG. 14) and stretching the secondary wire 730. The secondary wire 730 does not apply any stress on the primary wire 712 under these conditions.

Referring to FIG. 12, when the ambient temperature reaches the Austenite start temperature of the secondary wire 730, the secondary wire 730 begins a crystallographic phase transformation between Austenite and Martensite. As the ambient temperature increases to above the austenite finish temperature of the secondary wire 730, the secondary wire 730 enters its hot state, causing the secondary wire 730 to increase in modulus, thereby exerting a force on the force element 722. This increases the tensile load or stress on the primary wire 712. Optionally, a stop member 744 may be positioned adjacent to the force element 722 to block the force element 722 from moving beyond the first element position 724, in order to prevent the primary wire 712 from being stretched when it is in its cold state.

Figure 13:
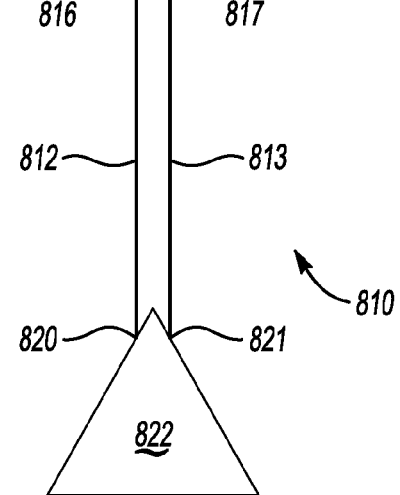
FIG. 13 is a schematic illustration of a ninth embodiment for a device in accordance with the present disclosure.

Referring to FIG. 13, a device 810 illustrating a ninth embodiment is shown. The device 810 includes a first primary wire 812 and a second primary wire 813 that are both composed of a first shape memory alloy. An activation source 814 is thermally coupled to the first and second primary wires 812, 813 and is operable to selectively cause the primary wire 812 and the secondary wire 813 to reversibly transform from a Martensitic phase to an Austenitic phase during a cycle. A controller 815 is operatively coupled to and configured to control the activation source 814. Referring to FIG. 13, the first primary wire 812 is operatively connected to a fixed structure 818 at a first end 816 and operatively connected to a force element 822 at a second end 820. The force element 822 may be a weight, spring or any other mechanism configured to exert a force. The second primary wire 813 is operatively connected to the fixed structure 818 at a first end 817 and operatively connected to the force element 822 at a second end 821. The first and second primary wires 812, 813 are characterized by a predetermined length to which they revert to in their hot state after being pseudo-plastically deformed.

During normal conditions when the ambient temperature is below a threshold temperature, both the first and second primary wires 812, 813 perform work. When the first and second primary wires 812, 813 are in their respective cold states, their elastic modulus and yield strength are sufficiently low such that they are elongated from their predetermined length. As the first and second primary wires 812, 813 are heated by the activation source 814 to above their Austenite finish temperature, the first and second primary wires 812, 813 revert to their predetermined length and increase in modulus, such that the first and second primary wires 812, 813 lift (or extend) the force element 822 together.

When the ambient temperature is at or above a predefined threshold temperature, the controller 815 disables the second primary wire 813. This increases the relative tensile load on the primary wire 812, allowing it to function like a primary wire at high stress at ambient temperatures above a threshold. The threshold temperature in this case may be selected by one of ordinary skill in the art for the particular application at hand.

Referring to FIG. 14, a device 910 illustrating a tenth embodiment is shown. The device 910 includes a first primary wire 912 and a second primary wire 913 that are both composed of a first shape memory alloy (SMA). An activation source 914 is thermally coupled to the first and second primary wires 912, 913 and is operable to selectively cause the primary wire 912 to reversibly transform from a Martensitic phase to an Austenitic phase during a cycle. A controller 915 is operatively coupled to and configured to control the activation source 914. A first end 916 of the primary wire 912 is attached to a fixed structure 918. A second end 920 of the primary wire 912 is operatively connected to a rotatable lever 922 such that second end 920 is able to displace. The lever 922 includes a first lever position 924 when the primary wire 912 is in its cold state. The lever 922 rotates in the direction 926 when the primary wire 912 is in its hot state. A first spring 928 is operatively connected to the lever 922 at one end and configured to bias the lever 922 towards the first lever position 924.

Referring to FIG. 14, the second primary wire 913 is operatively connected at one end to a fixed structure 918 and operatively connected at the other end to a movable connecting member 932, such that the other end is able to translate. The connecting member 932 at least partially surrounds the lever 922. A secondary wire 930 is operatively connected to the lever 922. The secondary wire 930 is composed of a second shape memory alloy having a lower Austenite finish temperature than the Austenite start temperature of the primary wire 912. The first and second primary wires 912, 913 and the secondary wire 930 are characterized by respective predetermined lengths to which they revert in their hot state after being pseudo-plastically deformed.

During normal operation when the ambient temperature is below the Austenite start temperature of the secondary wire 930, the connecting member 932 assumes a first connecting position 950, shown in solid lines in FIG. 14. In this configuration, the second primary wire 913 is configured to support the rotation of the lever 922 in the direction 926. Thus, both the first and second primary wires 912, 913 are performing work in this configuration. A leaf spring 940 is operatively connected to the secondary wire 930 and configured to bias the connecting member 932 towards the first connecting position 950.

When the ambient temperature is at or above the Austenite finish temperature of the secondary wire 930, the secondary wire 930 enters its hot state and reverts to its predetermined length, thereby drawing the connecting member 932 towards a second connecting position 952, shown in phantom in FIG. 16, at position 954. In this configuration, the second primary wire 913 is disengaged and no longer supports the rotation of the lever 922 in the direction 926. Thus, only the first primary wire 912 is performing work in this configuration. This increases the load on the first primary wire 912, allowing it to function like a wire at high stress at temperatures above a threshold.

Referring to FIG. 15, a method 1000 of controlling a transformation temperature of a primary wire 12 in a device 10 is provided, where the primary wire 12 is composed of a first shape memory alloy. This method 1000 is described with respect to FIGS. 1-2 but is applicable to all of the embodiments described above. In step 1002, a first end 16 of the primary wire 12 is attached to a fixed structure 18 while a second end 20 of the primary wire 12 is operatively connected to a movable structure (such as lever 22) such that the second end 20 is able to translate. In step 1004, the primary wire 12 is thermally coupled to an activation source 14 for selectively causing the primary wire 12 to reversibly transform from a Martensitic phase to an Austenitic phase during a cycle. In step 1006, the tensile load on the primary wire 12 is selectively increased when an ambient temperature is at or above a threshold temperature, thereby increasing the phase transformation temperature of the primary wire 12. In some embodiments (see devices 810 and 910 in FIGS. 13 and 14, respectively), selectively increasing the tensile load on a primary wire (812 and 912 in FIGS. 13 and 14, respectively) includes adding a second primary wire (813 and 913 in FIGS. 13 and 14, respectively) composed of the first shape memory alloy and disabling the second primary wire 813, 913 when the ambient temperature is at or above the threshold temperature. The second primary wire (813 and 913 in FIGS. 13 and 14, respectively) supports the primary wire (812 and 912 in FIGS. 13 and 14, respectively) when the ambient temperature is below a threshold temperature It should be appreciated that the method disclosed herein may be embodied as an algorithm operated by a controller or by analog circuitry. The controller may include, but is not limited to, a computer having a processor, memory, software, sensors, circuitry and any other components necessary for controlling the device and the shape memory alloy element.

Referring to FIGS. 1-14, the devices 10, 110, 210, 310, 410, 510, 610, 710, 810 and 910 may include any type or manner of apparatus that utilizes the primary wire within each device. For example, the devices 10, 110, 210, 310, 410, 510, 610, 710, 810 and 910 may include, but are not limited to, an air vent assembly, a pressure relief valve, a seat belt presenter, a circuit breaker, a sensor, or some other similar device. The primary wire 12 may be employed as an active actuator to induce movement in the devices 10, 110, 210, 310, 410, 510, 610, 710, 810 and 910 under certain conditions, as a passive actuator to induce a force or a displacement passively, such as in a super-elastic stent or denture wire, or as a sensor to determine operating conditions of the devices 10, 110, 210, 310, 410, 510, 610, 710, 810 and 910. Additionally, the primary wire in each device may be used both as a sensor and as an actuator or in some other manner not shown or described herein.

While the best modes for carrying out the invention have been described in detail, those familiar with the art to which this invention relates will recognize various alternative designs and embodiments for practicing the invention within the scope of the appended claims.

The invention claimed is:

1. A device comprising:
a primary wire composed of a first shape memory alloy;
wherein the primary wire defines first and second ends, the first end being rigidly attached to a fixed structure and the second end being able to displace;
an activation source thermally coupled to the wire and operable to selectively cause the primary wire to reversibly transform from a Martensitic phase to an Austenitic phase during a cycle;
a loading element operatively connected to the primary wire and including a secondary wire composed of a second shape memory alloy;
wherein the loading element is configured to selectively increase a tensile load on the primary wire when an ambient temperature is at or above a threshold temperature, thereby increasing a phase transformation temperature of the primary wire; and
wherein the threshold temperature is at least an Austenite start temperature of the secondary wire.

2. The device of claim 1, wherein:
the primary wire is characterized by an initial transformation temperature and a nominal load;
wherein the threshold temperature is approximately 5% to 90% lower than the initial transformation temperature on an absolute temperature scale; and
the tensile load applied by the loading element is approximately 5% to 90% of the nominal load.

3. The device of claim 1, further comprising:
a pulley operatively connected to the primary wire;
a force element operatively connected to the primary wire such that the primary wire pulls the force element when the primary wire transforms from the Martensitic phase to the Austenitic phase;
wherein the secondary wire is operatively connected to the pulley and configured to create an opposing force on the primary wire when the ambient temperature exceeds the threshold temperature.

4. The device of claim 1, further comprising:
a force element operatively connected to the primary wire, such that the primary wire pulls the force element when the primary wire transforms from the Martensitic phase to the Austenitic phase;
wherein the secondary wire is operatively connected to the force element and configured to create an opposing force on the primary wire when the ambient temperature exceeds the threshold temperature.

5. The device of claim 1, further comprising:
a rotatable lever operatively connected to the primary wire;
wherein the lever has a first lever position when the primary wire is in a cold state and a second lever position when the primary wire is in a hot state;
a first spring operatively connected to the lever at one end and fixed at another end, the first spring biasing the lever towards the first lever position.

6. The device of claim 5, wherein the secondary wire is operatively connected to the lever at one end and fixed at another end.

7. The device of claim 6, further comprising a stop member configured to prevent stretching of the primary wire when the primary wire is in the Martensitic phase.

8. The device of claim 5, further comprising:
a strain-limiting mechanism operatively connected between the secondary wire and the fixed structure, the strain-limiting mechanism including:
a pre-tensioned second spring configured to exert an approximately constant force on the secondary wire;
a connector operatively connected to the secondary wire; and
a limiting member at least partially surrounding the connector and configured to limit strain on the secondary wire.

9. The device of claim 5:
wherein the loading element further includes an auxiliary lever configured to selectively couple to the lever when the ambient temperature exceeds the threshold temperature; the auxiliary lever including:
a pivoted hook rotatable relative to the auxiliary lever between a first hook position and a second hook position, the auxiliary lever being coupled to the lever when the hook member is in the second hook position;
an auxiliary spring operatively connected to and configured to bias the hook towards the first hook position; and
wherein the secondary wire is operatively connected to the hook and configured to pull the hook towards the second hook position when the ambient temperature exceeds the threshold temperature.

10. The device of claim 5, further comprising:
a leaf spring operatively connected to the opposing wire and configured to resist rotation of the lever towards the second lever position when the ambient temperature exceeds the threshold temperature.

11. The device of claim 1, further comprising:
a rotatable lever operatively connected to the primary wire;
a connecting member at least partially surrounding the lever and movable between two positions, a first connecting position when the ambient temperature is below a threshold temperature, and a second connecting position when the ambient temperature exceeds the threshold temperature;

a leaf spring operatively connected to the secondary wire and configured to bias the connecting member towards the first connecting position;

a second primary wire composed of the first shape memory alloy and operatively connected to the connecting member; and wherein the second primary wire is configured to assist rotation of the lever only when the connecting member is in the first connecting position.

12. A device comprising:

a primary wire composed of a first shape memory alloy;

wherein the primary wire defines first and second ends, the first end being rigidly attached to a fixed structure and the second end being able to displace;

an activation source thermally coupled to the wire and operable to selectively cause the primary wire to reversibly transform from a Martensitic phase to an Austenitic phase during a cycle;

a loading element operatively connected to the primary wire and configured to selectively increase a tensile load on the primary wire when an ambient temperature is at or above a threshold temperature, thereby increasing a phase transformation temperature of the primary wire;

wherein the loading element is a compression spring fixed at one end;

wherein the compression spring is at least partially surrounded by a phase-change material;

wherein the phase-change material is substantially solid and configured to compress the compression spring when the ambient temperature is below the threshold temperature;

wherein the phase-change material is configured to do one of either melt or exhibit a decrease in stiffness of at least 50% when the ambient temperature is at or above the threshold temperature; and wherein the phase-change material is configured to release the compression spring to exert a tensile load on the primary wire when the ambient temperature is at or above the threshold temperature.

13. The device of claim 12, wherein the phase-change material is wax.

14. A device comprising:

a primary wire composed of a first shape memory alloy;

wherein the primary wire defines first and second ends, the first end being rigidly attached to a fixed structure and the second end being able to displace;

an activation source thermally coupled to the wire and operable to selectively cause the primary wire to reversibly transform from a Martensitic phase to an Austenitic phase during a cycle;

a loading element operatively connected to the primary wire and configured to selectively increase a tensile load on the primary wire when an ambient temperature is at or above a threshold temperature, thereby increasing a phase transformation temperature of the primary wire;

wherein the loading element is a heat-expandable element movable between two configurations, a rest configuration when the ambient temperature is below the threshold temperature and an extended configuration when the ambient temperature is at or above the threshold temperature;

a translatable slider operatively connected to the wire;

an extension spring operatively connected to the slider at one end and the heat-expandable element at the other end, the extension spring defining a biasing force; and a fixed stop member configured to prevent the slider from translating towards the expandable element beyond a threshold point, thereby preventing the primary wire from being stretched when the primary wire is in the Martensitic phase.

15. The device of claim 14, wherein the heat-expandable element includes:

a first metallic layer having a first coefficient of thermal expansion;

a second metallic layer flanking first metallic layer and having a second coefficient of thermal expansion;

wherein the second coefficient is different from the first coefficient.

16. The device of claim 14, wherein the heat-expandable element includes:

a housing;

a phase-change material located within the housing and operatively connected to the extension spring;

an attachment member at least partially within the housing and connected to the extension spring, the attachment member being at least partially surrounded by the phase-change material;

wherein the phase-change material is configured to sufficiently expand at or above the threshold temperature to overcome the biasing force of the extension spring; and wherein the phase-change material does not overcome the biasing force of the extension spring when the ambient temperature is below the threshold temperature.

17. The device of claim 16, wherein the phase-change material is paraffin wax.

* * * * *